United States Patent [19]
Vild et al.

[11] 3,916,301
[45] Oct. 28, 1975

[54] MAGNETIC FLAW DETECTION APPARATUS

[75] Inventors: Joseph P. Vild, Lindhurst; Wilbert J. Janos, North Ridgeville, both of Ohio

[73] Assignee: Republic Steel Corporation, Cleveland, Ohio

[22] Filed: May 20, 1974

[21] Appl. No.: 471,311

[52] U.S. Cl. .................................................. 324/37
[51] Int. Cl.² ....................................... G01R 33/12
[58] Field of Search ............................... 324/37, 40

[56] References Cited
UNITED STATES PATENTS

| | | | |
|---|---|---|---|
| 2,415,789 | 2/1947 | Farrow ............................. | 324/40 |
| 3,475,681 | 10/1969 | Nerwin et al. ...................... | 324/37 |
| 3,603,874 | 9/1971 | Posey ............................. | 324/37 |

*Primary Examiner*—Robert J. Corcoran
*Attorney, Agent, or Firm*—Watts, Hoffmann, Fisher & Heinke Co.

[57] ABSTRACT

An apparatus and method for flaw detection in relatively moving elongated workpieces is disclosed. The apparatus includes an exciter circuit for producing an electromagnetic field in the region of the workpieces, and a detection circuit having a differential coil for producing flaw indicating signals in response to nonuniformities in the field caused by workpiece flaws. The apparatus includes use of the exciter circuit as an open weld detector, and tuning the exciter circuit to resonance in the presence of an unflawed workpiece for indicating detuning of the exciter circuit in response to open welds in workpieces subsequently passing through the region of the field. Balancing circuitry is disclosed for nulling the error voltage appearing across the entire differential detector coil due to slight nonuniformities in the windings of the differential coil. A specific end signal suppressor circuit is provided for sensing workpiece ends passing through the field and temporarily disabling the detector circuit from producing the flaw indicating signals for a predetermined time following passage of each workpiece end through the field.

1 Claim, 5 Drawing Figures

MAGNETIC FLAW DETECTION APPARATUS

BACKGROUND OF THE INVENTION

1. Field of the Invention

This invention pertains to nondestructive material testing and particularly to testing for flaws in elongated metallic workpieces.

2. Description of Prior Art

Various methods and apparatus have been proposed for enabling nondestructive testing of elongated metal workpieces such as wires, rods, tubing, pipes and billets. These proposals generally enabled detection of seams, voids and other defects which could be troublesome in a final product made from such workpieces.

In the past, a common method of inspecting such workpieces for defects was by visual observation. In spite of the utmost care, a mill inspector often overlooked seams or other defects. Moreover, visual inspection did not dependably determine the depth of a defect. Another problem with visual inspection is that it is dependent on human judgement and vision, both of which are subject to change, even in the case of the same inspector.

These problems have been overcome to a considerable degree by the use of automatic nondestructive testing equipment. Generally, such equipment operates by exciting an electromagnetic field in the region of the workpiece, and by moving the workpiece relatively through the field with respect to a sensing device, such as a detection coil, for producing a signal in response to nonuniformities in the electromagnetic field caused by workpiece flaws. The detection coil may either encircle the workpiece path of movement, or be placed adjacent the path. The signals produced by the detection coil are converted to flaw indicating signals indicating the need for corrective action with respect to the flawed workpieces. The detection circuit may be responsive to a pattern of distortion of eddy currents or magnetic fields induced in the workpiece for test purposes. It is known to use the detection coil itself to generate the electromagnetic field in the workpiece region.

Where ferromagnetic workpieces are tested, it is known to provide a saturation circuit having a saturation solenoid coil connected to a source of DC voltage for inducing a large DC magnetic field in the workpieces. The purpose of this is to reduce the magnetic permeability of the workpiece to near unity to enable eddy currents generated by the exciter field to penetrate the workpiece surface and to cancel out magnetic variations in the workpieces which might affect test results.

In eddy current testing, it is also known to use a separate exciter circuit including an exciter coil for inducing an alternating electromagnetic field in the workpiece. The exciter coil has either encircled, or been placed adjacent to, the workpiece path. A detection circuit is provided having a separate detection coil, connected to other circuit components for generating a flaw indicating signal in response to the voltage generated in the detection coil by the nonuniformities in the electromagnetic field caused by workpiece flaws.

The flaw sensing coil has frequently been of the differential type. A differential coil consists of at least two series connected windings, substantially identical but wound with opposing magnetic polarity. The advantage of the differential coil is that is is not sensitive to even large magnitude electromagnetic fields which are substantially uniform over the whole region of the coil. Therefore, a differential coil does not produce an output with respect to ambient electromagnetic fields passing through it, such as from the exciter circuit, but will only respond to localized nonuniformities in the field resultant on the presence of workpiece flaws proximate the coil.

Another advantage of the differential coil is that a relatively small flaw, introducing a relatively small nonuniformity of the field induced in the workpiece, produces an output voltage across the differential coil which is more easily detected than that produced by a coil wound only in one direction. A coil wound in only one direction, when excited, will constantly produce an output which is of relatively large magnitude. The presence of a flaw in a workpiece moving with respect to such a detection coil only alters this signal by a fractional amount. It is more difficult to detect small changes in a relatively large signal than to detect the appearance of a signal, even though small, where there was none before.

A problem with the use of the differential coil is that most differential coils, however carefully constructed, are slightly unbalanced. They are unbalanced because the two oppositely wound portions frequently do not have identical configurations. In presence of a uniform field, such an unbalanced differential coil will produce an undesirable error output. This is undesirable in instances such as flaw testing because it is desired the coil produce no output in the presence of an unflawed workpiece.

In order to obtain a proper zero output from the differential coil in the presence of an unflawed workpiece, balancing circuits have been devised to compensate for the imbalance when an unflawed workpiece is placed proximate the coil. The balancing circuit is adjusted to achieve a zero output with the unflawed workpiece in proximity to the coil to prepare the system for detection of workpiece flaws. It is known in balancing circuits for differential coils to provide the differential coil with a center tap between the two oppositely wound portions and to separately pick off the output voltage across each of the two portions, and to null these two signals against each other, by means of a bridge, for example, in order to achieve the zero output.

In prior art balance circuits, the operation of the balance circuit will often undesirably affect the amplitude of the output from the balancer to the remainder of the detection circuit. It is desirable that the balance circuit produce an output independent of the setting of the balance circuit which is required for nulling.

Many types of flaw testing equipment employ a plurality of detection coils simultaneously, in order to scan various parts of a workpiece at the same time for faster operation than in the case of single detection coils. Often, the detection coils must be mounted in such a way that they not only move relative to the workpiece, but move with respect to the entire inspection system as well.

The use of such balancing circuits suffers from the disadvantage that it is necessary for three leads to be extended to each detection coil. The necessity for this number of leads renders difficult and more complicated the task of connecting the several detection coils to the other components of the detection circuitry which produce the flaw indicating signals. Also, the expense of constructing such apparatus is increased by the need for this plurality of leads.

Some flaw testing systems have employed use of the detection coil in the exciter circuit in a "self-excited" mode for flaw detection, rather than using the exciter circuit solely for inducing the electromagnetic field in the workpieces. Such systems incorporate means for monitoring the current and/or voltage in the exciter circuit, indicating the presence of flaws in response to variations in such voltage and/or current.

A particular type of flaw the sensing of which is desirable is the "open weld." An open weld is a relatively long segment of the weld of a pipe which is not properly closed. Such a defect generally runs over relatively long portions of the workpiece surface as compared with the dimensions of the coils of the flaw testing apparatus.

Previously, open welds have been detected by the differential coils used for detecting other types of flaws, such as pits or voids. The differential detection coil is not entirely suitable for detecting open welds. In a differential coil, such an elongated defect produces a signal only at the time the defect approaches the coil and at the time the trailing edge of the defect leaves the region of the coil. While the open weld is progressing past the flaw sensing apparatus, the coil emits a zero signal just as in the case of an unflawed workpiece. This is because the differential coil emits a zero signal whenever the electromagnetic field in the region of the differential coil is uniform, as in the case when an elongated open weld is passing by the differential coil. It is desirable to produce a signal in response to the presence of an elongated open weld which is coincident in time with the passage of the entire open weld past the flaw sensor apparatus, while maximizing the amount of current and/or voltage variation in the exciter circuit which occurs in response to the open welds. When an end of a workpiece passes by the flaw detecting apparatus, a large discontinuity in the induced electromagnetic exciting field takes place. This discontinuity causes the apparatus to produce a large signal resembling the signal occurring in the presence of a passing flaw. Such a system, without compensation, will misinterpret the passage of an end of a workpiece as a flaw, and will produce a signal indicating a flaw where none in fact exists.

To alleviate this problem, end signal suppressor circuits have been developed. Such end signal suppressor circuits commonly incorporate mechanical or photoelectric end sensing apparatus, or an end sensing coil which produces an end signal in response to the passage of a workpiece end by the end sensing coil. The end sensing circuits have discriminated between relatively small signals produced by the end sensing coil which are merely in response to flaws in the workpiece, and the relatively large signals produced in response to the passage of a workpiece end past the end sensing coil. In response to these large end signals, the end signal suppressor circuit temporarily prevented the detection circuit from indicating a flaw in response to the end signal, and prevented the detection circuit from indicating a flaw where none existed.

Previous end signal suppressor circuits sense the passage of a trailing end of a workpiece, and disable the detection circuit until the end signal suppressor circuit senses the leading edge of the next workpiece. This approach has the disadvantage of requiring separate circuitry both for responding to a trailing edge to disable the detection circuit, and also for responding to the leading edge to re-enable the detection circuitry. Such additional circuitry adds to the cost and complexity of the flaw sensing apparatus. Prior art end signal suppressors also frequently require disablement of the detection circuitry for longer periods than necessary, disablement being required only during the time that the end actually passes the detection coil.

End signal suppressor circuits of the prior art have generally utilized end sensing coils which are wound in one direction only, which sense variations in the DC saturation field. These coils, as pointed out above, produce a signal in response to ambient alternating electromagnetic fields in their region, and accordingly produce a substantial response to the exciting fields. It is desirable for the end signal to be as large as possible in comparison to the signal generated in the absence of the passage of an end. This constraint enhances the ease of detecting end signals and discriminating between the end signals and other signals which may be generated by the end sensing coil.

It is also desirable to locate the end sensing coil as near as possible to the detection coil. This makes unnecessary any substantial delay between the occurrence of the end signal and the initiation of detector circuit disablement. Such proximate placement of the end sensing coil and the detector coil places the end sensing coil in the region of substantial influence of the exciter and saturating fields, however, and aggravates the above stated problem of undue influence on the end sensing coil by these fields.

Some prior art flaw detection systems have employed phase monitors, to compare the phase of a reference derived from the exciter circuit with that signal derived from the detection coil in the presence of a typical workpiece flaw. The phase monitor emits a signal when the compared phases are substantially equal, furnishing a supplemental indication of a typical workpiece flaw which serves as a backup flaw indication and a means for calibrating the apparatus preparatory to operation.

Such phase monitoring circuits have been used in systems utilizing the detector coil for both excitation and detection, having no separate exciter circuit. The systems having no separate exciter circuit suffer slight inherent inaccuracy due to the mutuality of effect between the exciting signal in the detection coil and the variations in that signal caused by workpiece flaws. It is desirable to provide the benefits of phase monitoring to systems having separate exciter circuits as well, because the precision afforded by phase monitoring can best be employed in these more accurate systems.

Summary of the Invention

This invention provides novel circuitry systems and methods for detecting flaws in elongated metal workpieces. A preferred embodiment provides improved sensitivity in detection of open welds in pipe. Another embodiment provides a simplified apparatus and method for accurate balancing of a differential detection coil. The prevention also provides a simplified end signal suppressor having greater sensitivity and flexibility than available before. A novel phase monitoring application is also shown.

A preferred embodiment of the system of this invention includes an exciter circuit, hving solenoid exciter coil with a complex input impedance, for producing an electromagnetic field in the region of the workpieces, and a detection circuit for producing flaw indicating signals in response to nonuniformities in the induced field due to workpiece flaws. The exciter coil is inductively couplable to the workpieces to change the complex impedance of the exciter circuit as the workpieces move in proximity to the coil.

In this preferred embodiment, the exciter circuit is used to detect open welds in the workpieces. A variable capacitance in the exciter circuit is adjustable to tune the exciter circuit to series resonance when an unflawed workpiece is inductively coupled to the coil. Open welds are detected by detecting detuning of the exciter circuit. The detuning detection is accomplished by sensing a reduction in the exciter circuit current below a predetermined level.

The use of the solenoid exciter coil in the exciter circuit and the tuning of the exciter circuit when coupled with an unflawed workpiece enables generation of an indication of an open weld coincident with the passage of the open weld by the exciter coil, and renders the exciter current a more highly dependent function of the complex impedance of the exciter circuit than if the exciter circuit were considerably off resonance when coupled with an unflawed workpiece. This provides for improved sensitivity of open weld detection.

The invention provides for a simplified system of balancing the differential detection coil of the detection circuit. In a preferred embodiment the error signal produced across the entire differential coil in the presence of an unflawed workpiece is combined with an independently derived reference signal. In one preferred form, the combination of signals is by a summing circuit, and the reference signal is derived by adjusting the phase of a signal having frequency equal to that of the error signal to be opposite that of the error signal, and the amplitude to be equal.

In this embodiment, the reference signal is derived by phase shifting a signal having equal frequency with the error signal by means of a sine-cosine potentiometer, the phase shift being continuously adjustable. A series RC branch is provided across the output of the sine-cosine potentiometer, the branch elements having values selected to maintain the amplitude of its output, at a point, constant regardless of phase shift magnitude.

In another preferred form, the combining is by a difference sensing circuit, and the reference phase and amplitude are adjusted to be equal with those of the error signal. The phase shift in the deriving of the reference signal of this embodiment is by two series connected operational amplifiers, permitting phase shifting in a range of signal frequencies, without unduly changing amplitude.

Such balancing circuitry enables balancing of the entire signal produced by the differential coil, rather than separately balancing the outputs of each portion of the coil. The balancing can thus be done without the use of a center tap on each detection coil and without the complexity and difficulty of operation and manufacture engendered by the need for three leads extending to each detection coil.

In another preferred form, the apparatus also includes an end signal suppressor circuit for temporarily disabling the detection circuit from producing flaw indicating signals, in response to the passage of a workpiece end by the detector coil. The end signal suppressor includes an end sensing coil which produces an end signal having at least a predetermined value in response to the passage of a workpiece end past the end sensing coil. The end sensing coil is of the differential type, which may be located very near the detector coil without unwanted response to the exciter and saturator fields. This absence of response to ambient fields permits the coil to respond only to the end signals, increasing the sensitivity of the end signal suppressor over such circuits employing conventionally wound coils.

The end signal suppressor responds to each occurrence of an end signal. The direction of workpiece motion carries the workpiece end past the detection coil almost immediately after passing the end sensing coil. The end signal suppressor prevents the detection circuit from producing flaw indication signals for a time only long enough to permit the workpiece end to clear the region of the detection coil. The period of disablement can begin immediately upon the end signal occurrence without unduly prolonging the disablement. This eliminates the need for timing circuitry for delayed disablement initiation. The end signal suppressor circuit, after the lapse of a sufficient time to allow the workpiece end to clear the detection coil, ceases the prevention of the flaw indicating signals. This assures that the detection circuit is disabled only during that time when a workpiece end is passing the detector coil.

Another preferred embodiment of this invention includes a particular type of phase monitoring circuit adapted for use in a system having a separate exciting circuit.

DESCRIPTION OF THE PREFERRED EMBODIMENT

Figure 1:
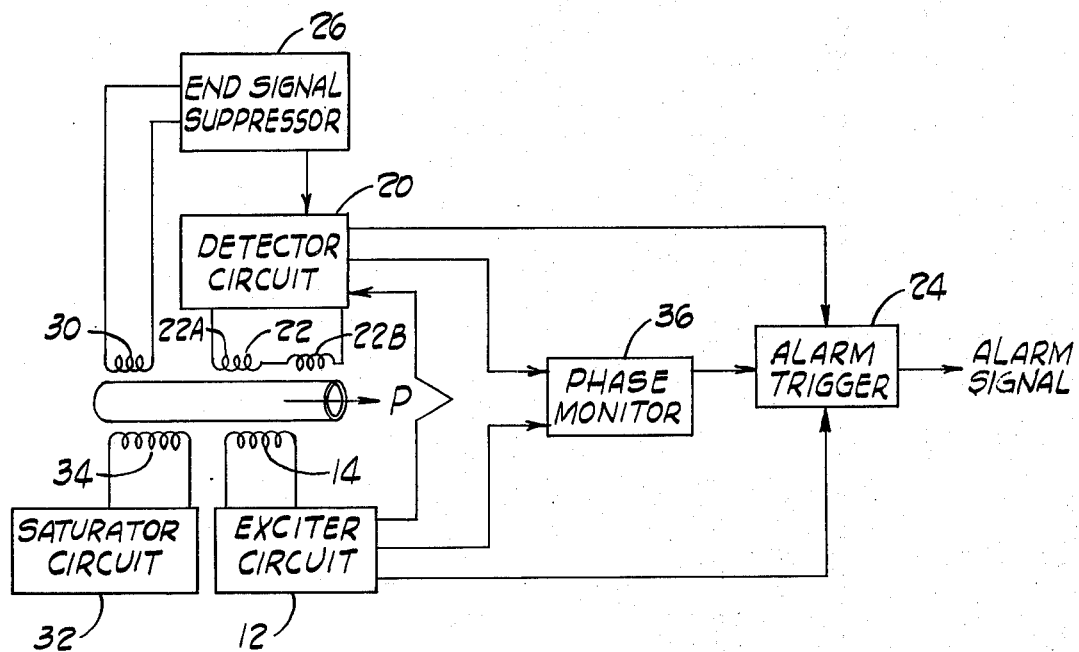
FIG. 1 is a simplified block diagram of a system embodying this invention.

A system 10 for detecting flaws in workpieces is shown in FIG. 1. A typical workpiece W is illustrated in FIG. 1 is moving relative to the system 10 along a path indicated by the arrow P. The workpiece W is preferably an elongated metallic item, such as a portion of rod, wire or pipe.

The system 10 includes an exciter circuit 12 connected to an exciter coil 14 for generating an alternating electromagnetic exciting field in the region of the workpiece W. A detection circuit 20 is connected to a detection coil 22 positioned near the path P for sensing variations in the electromagnetic field which occur in response to the presence of flaws in the workpiece W. The detection circuit 20 produces flaw indicating signals in response to the sensing of such workpiece flaws. The flaw indicating signals actuate an alarm trigger 24 to produce an alarm signal indicating the presence of a flaw in the workpiece W and the need for corrective action. An end signal suppressor circuit 26 connected to an end sensing coil 30 detects the passage of workpiece ends past the end sensing coil 30 and temporarily prevents the production of flaw indicating signals and the actuation of the alarm trigger 24 during the time when the workpiece end is passing by the detection coil 22. A saturator circuit 32 connected to a saturator coil 34 generates a DC magnetic field in the workpiece W which magnetically saturates the workpiece W, causing the magnetic permeability of ferromagnetic workpieces W to approach unity, to allow eddy currents to penetrate the skin of the workpiece and to cancel out magnetic nonuniformities in the workpieces. A phase monitoring circuit 36 compares the phase of the alternating field with that of the signal generated by the detection coil 22 in the presence of a workpiece flaw and responds to a coincidence between such phase angles to furnish a supplemental indication of the presence of a flaw in the workpiece W.

Figure 2:
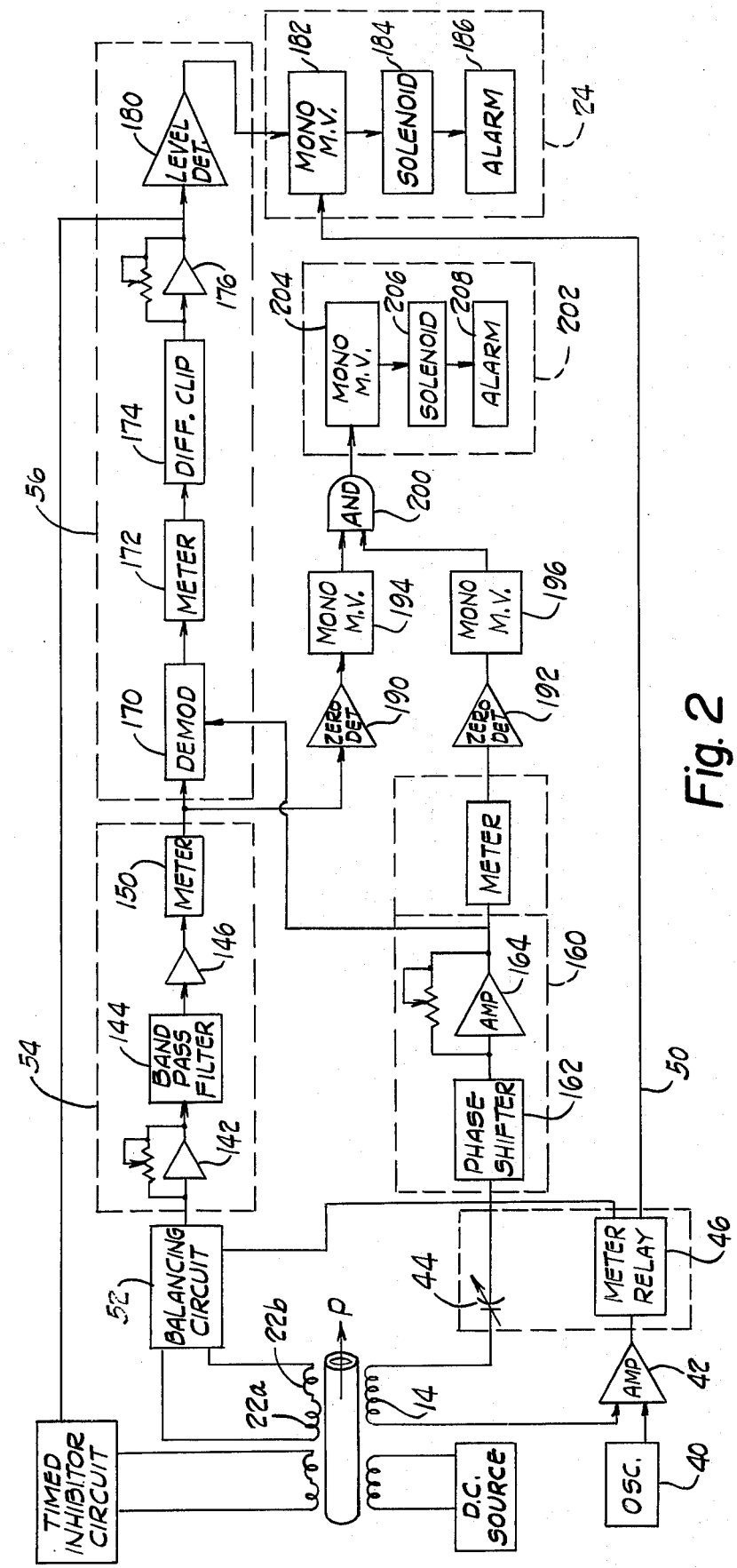
FIG. 2 is a detailed block diagram of a system embodying this invention.

The exciter circuit 12 further includes an oscillator 40, an amplifier 42, a variable reactance 44, and a meter relay 46, as shown in FIG. 2.

The oscillator 40 is preferably a suitable power oscillator for generating a substantially sinusoidal output signal having a frequency of between 400 Hz and 20,000 Hz. The lower frequencies are used to test thick walled workpieces, to allow deep penetration of the eddy currents, while higher frequencies having a better signal to noise ratio, are more suitable for identifying small flaws. The amplifier 42, connected to the output of oscillator 40, is an operational amplifier of a conventional design for amplifying such a signal, such as a type 440.

The exciter coil 14 is preferably a solenoid coil, and is driven by an alternating signal of approximately 50 volts produced by the oscillator 40 and the amplifier 42. Although the exciter coil 14 is shown in FIGS. 1 and 2 as being adjacent the path P of the workpiece W, it is to be understood that the exciter coil 14 may also encircle the workpiece W as it moves relatively along the path P.

The variable reactance element 44 is connected in series with the exciter coil 14 in the exciter circuit 12. Preferably, the variable reactance 44 is a variable capacitor having a variable capacitance in the range of from approximately 0.01 microfarads to 1 microfarad. Such a variable capacitor 44 is preferably a decade capacitance, many examples of which are commonly available commercially.

When the oscillator 40 is actuated, the oscillator 40, in combination with the amplifier 42 establishes a substantial alternating current in the exciter circuit including the exciter coil 14 and the series connected variable capacitor 44. This alternating current establishes an alternating electromagnetic field in the region of the workpiece W as it passes the exciting coil 14 along the path P.

The meter relay 46 comprises an ammeter for sensing the current flowing in the exciter circuit, which emits a signal on the lead 50 in response to the reduction of the value of current flow in the exciter circuit below a predetermined level.

The variable capacitor 44 and the meter relay 46 together comprise an open weld detector. Open welds are elongated defects in pipe workpieces which result from incomplete closure of the elongated seam in the pipe which is optimally welded closed. Open welds differ from other flaws such as localized cracks, voids or pits in that they typically extend for long distances along the workpiece W. It is desirable to be able to identify the entire length of an open weld, rather than simply its end portions.

In a preferable mode of operation, an unflawed workpiece is moved to the region of the exciter coil 14. This results in inductive coupling between the workpiece W and the exciter coil 14. The exciter circuit thus exhibits a complex input impedance which is dependent upon the coupled inductance of the workpiece W, which inductance is in turn a function of the presence or absence of flaws in the workpiece W. The variable capacitor 44 is adjusted to tune the exciter circuit to series resonance.

During the time that an open weld is passing by the region of the exciter coil 14, the workpiece inductance and the complex input impedance of the coil 14 are altered. If the variable capacitor 44 has been adjusted to tune the exciter circuit to series resonance in the presence of an unflawed workpiece, then the appearance of an open weld flaw in a workpiece passing by the exciter coil 14 will cause a detuning from resonance of the exciter circuit. Such detuning will result in a decrease in the amount of current flowing in the exciter circuit.

The meter relay 46 is capable of sensing this decrease in current, and in response to such a decrease, emits a signal on the lead 50 which may be utilized to indicate the need for corrective action with respect to the workpiece W. The meter relay 46 is preferably API Model 503K 0–250 m.a. single low set point type.

The detection circuit 20, in combination with the detection coil 22 detects variations and nonuniformities in the alternating electromagnetic field generated in the region of the workpiece W by the exciter circuit 12.

The detection circuit 20 receives signals generated by the detection coil 22 and produces flaw indicating signals in response to signals produced by the detection coil 22 in response to flaws in the portion of the workpiece W passing by the detection coil 22.

The detection circuit connected to the detection coil 22 includes a balancing circuit 52 for nulling error voltages appearing across the detection coil 22. The detection circuit 20 further includes an amplification and filtration stage 54, as shown in FIG. 2, and a demodulation shaping circuit 56 for demodulating and shaping the signals produced by the detection coil 22, to generate flaw indicating signals.

The detection coil 22 is preferably a differential coil. Such a differential coil comprises two portions 22A and 22B connected in series and in close proximity to one another. The portions 22A and 22B are wound such that they have opposing magnetic polarity. The detection coil 22 ideally produces no output in response to a substantially uniform ambient electromagnetic field passing through both portions. The detection coil 22 only produces a signal in response to nonuniformity in the electromagnetic field occurring when the induced voltages in the portions 22A and 22B are unequal. Such a condition prevails when a workpiece flaw is positioned near, but off center, with respect to the detection coil 22.

The signal produced across the entire detection coil 22 has the same frequency as that produced by the exciting circuit, but varies in amplitude and phase in response to the presence of workpiece flaws moving past the detector coil 22. The frequency of the signal produced by the detection coil 22 is known as the carrier frequency.

Differential detector coils commonly produce an error voltage in the presence of a uniform field passing through the region of the oppositely wound portions 22A and 22B. This error voltage results in there being in output across the detection coil 22 even when the detection coil 22 is positioned adjacent or encircling an unflawed workpiece. This condition is caused by minute differences in the windings of the portions 22A and 22B.

The balancing circuit 52 is adjustable to null out this error signal produced by the coil 22 and to produce an output of zero value to the remainder of the detection circuit when an unflawed portion of a workpiece is passing by the detection coil 22, producing a non-zero output only in response to actual workpiece flaws.

The balancing circuit 52 includes a circuit 60 for deriving a phase and amplitude controlled reference signal (illustrated in FIGS. 3 and 4) having a frequency equal to that of the electromagnetic alternating field induced by the exciter circuit 12, an a bucking circuit 62 for combining the reference signal and the error signal produced across the entire differential detection coil 22 to null out the error signal produced by the detection coil 22 to produce an output having a zero value when an unflawed workpiece is positioned proximate the detection coil 22.

The reference deriving circuit includes an adjustable phase shifter 66, and an attenuator 70 connected to the output of the adjustable phase shifter. In one preferred embodiment of the balance circuit 52, the reference signal is derived from the output of the amplifier 42 in the exciter circuit 12, the output of the amplifier 42 being applied across the input terminals of a transformer 72 (see FIG. 3). The output of the transformer 72 is input to the adjustable phase shifter 66, which, in the preferred embodiment of FIG. 3, comprises a sine-cosine potentiometer including a bridge circuit comprising the resistors 74, 76, 78 and 80, the ganged wiper arms 82 and 84, the resistor 86, and the capacitor 90. The sine-cosine potentiometer continuously varies the phase angle of the signal input to it from the transformer 72 in response to the ganged movement of the wiper arms 82 and 84. The resistor 86 and the capacitor 90 preferably have values which are chosen such that the amplitude of the signal appearing at their midpoint 91 remains constant for a range of adjustment of the ganged wiper arms 82 and 84.

The output of the adjustable phase shifter 66 appearing at the terminal 92 has a phase which is a function of the setting of the ganged wiper arms 82 and 84. The amplitude of the signal appearing at the terminal 91 will remain constant for a range of phase angle settings, as long as the frequency input to the transformer 72 remains constant. When it is desired to change the frequency input from the exciter circuit 12 to the transformer 72, the values of the resistor 86 and the capacitor 90 must be altered accordingly, if the amplitude of the signal appearing at the point 91 is to be maintained constant for a range of phase angle settings.

Figure 3:
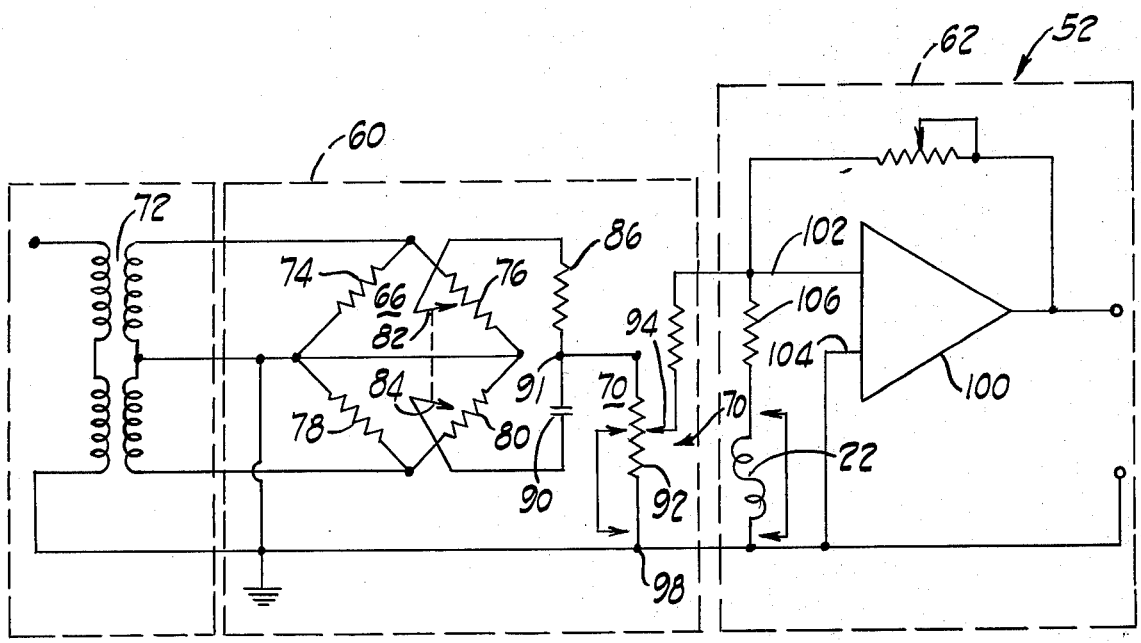
FIGS. 3 and 4 are schematic drawings showing alternate preferred embodiments of a portion of the system shown in FIGS. 1 and 2.

In the preferred embodiment of FIG. 3, the attenuator comprises a potentiometer including a resistor 92 and a wiper arm 94. The amplitude of the voltage appearing on the wiper arm 94 will thus be a function of its setting on the resistor 92, and can be manipulated as desired. The signal appearing at the wiper 94 is phase and amplitude adjustable, within substantial ranges.

The bucking circuit of the preferred embodiment of FIG. 3 comprises a summing amplifier 100 having two inputs 102 and 104. The detection coil 22 is connected between the inputs 102 and 104 in series with a resistor 106, so that the signal from the entire detection coil appears across the inputs of the summing amplifier 100. Likewise, the phase and amplitude adjustable signal appearing at the wiper 94 is also connected between the inputs 102 and 104 of the summing amplifier 100. The summing amplifier 100 is preferably an operational amplifier type 1741 operated in its summing mode.

The operation of the balancing circuit of FIG. 3 is as follows. An unflawed workpiece is positioned proximate the detection coil 22. The exciter circuit 12 is actuated in order to produce the alternating electromagnetic field in the region of the workpiece W. If there are nonuniformities between the portions 22A and 22B of the detection coil 22, an error signal will be generated across the entire detection coil 22. The reference signal deriving circuit is then adjusted to provide a signal which is opposite in phase and equal in amplitude to the error signal generated by the detection coil 22. The achievement of this condition is detected by sensing a zero output of the summing amplifier 100. When this output goes to zero, it is known that the error signal inherent in the detection coil 22 has effectively been nulled out. The output of the summing amplifier 100 will thus be zero for all conditions in which an unflawed workpiece is proximate the detection coil 22, and the output of the summing amplifier 100 will be a non-zero value only when an actual flaw exists in the workpiece W proximate the detection coil 22. The output of the summing amplifier 100 will be an AC signal of the carrier frequency, varying in phase and amplitude with respect to the nature of the flaw detected.

Figure 4:
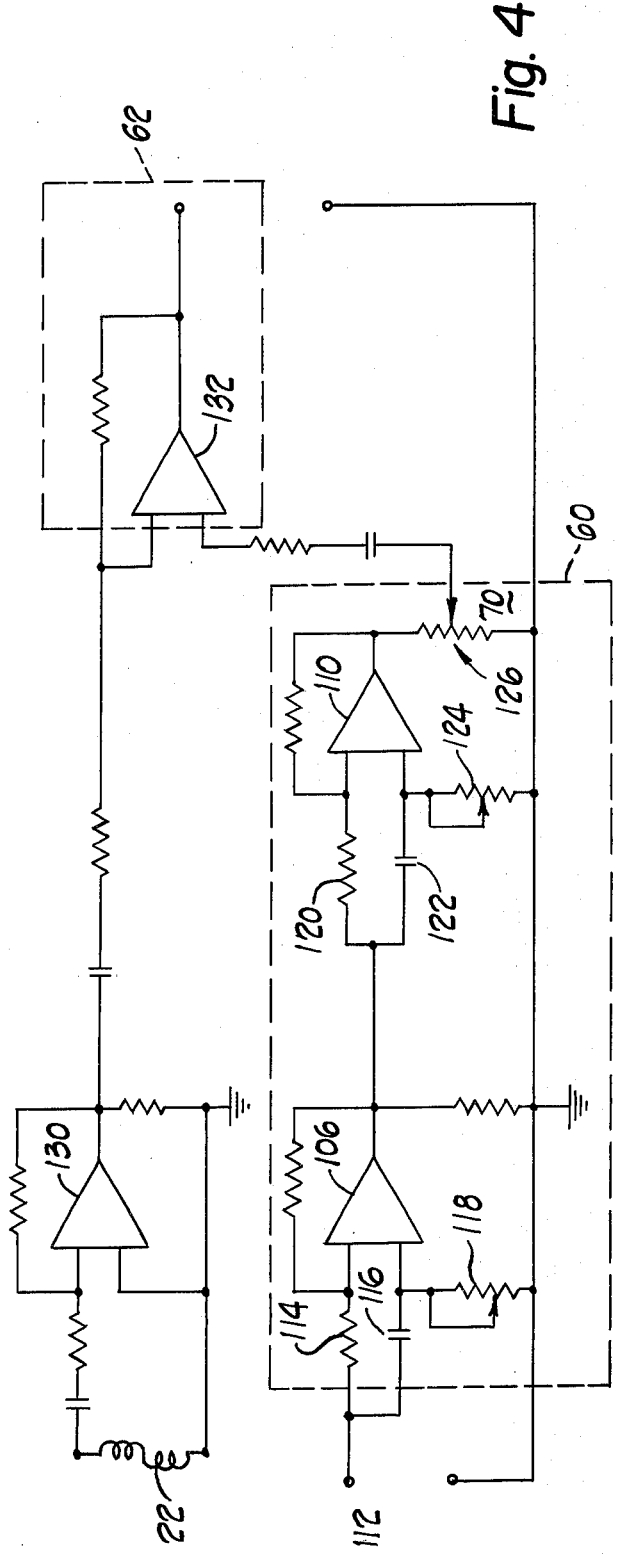
Figure 5:
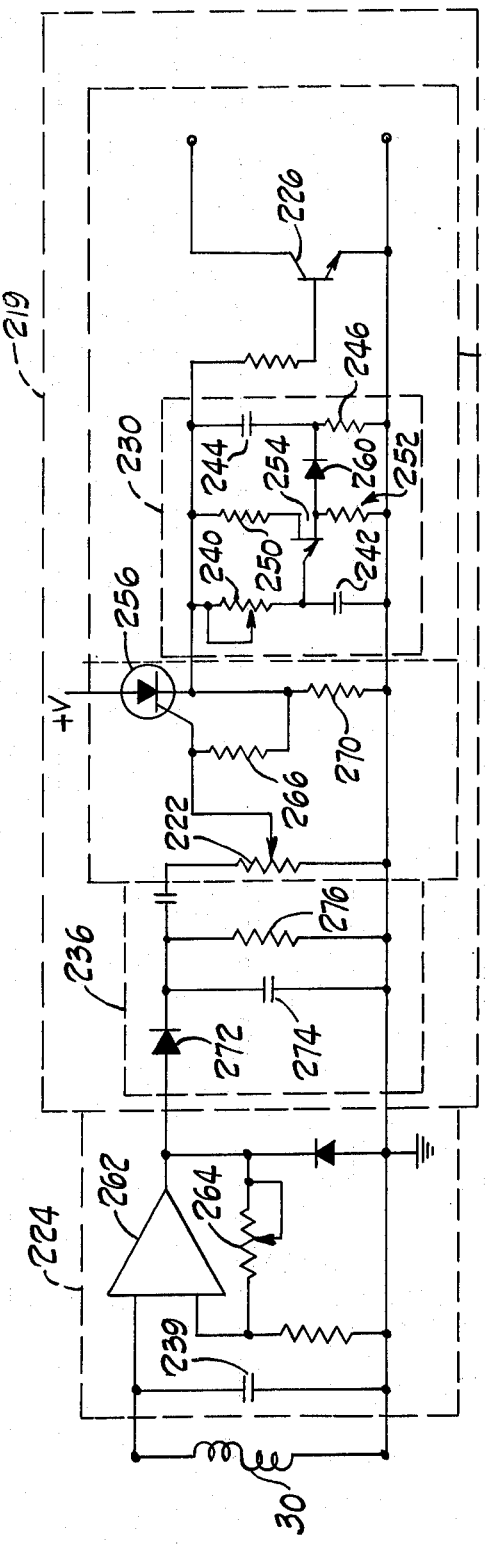
FIG. 5 is a schematic drawing showing a preferred embodiment of another portion of the system shown in FIGS. 1 and 2.

Another preferred embodiment of a balancer circuit 52 is illustrated in FIG. 4. The adjustable phase shifter in the FIG. 4 embodiment includes the operational amplifiers 106 and 110 and their associated circuitry. The operational amplifier 106 is a summing amplifier, which is fed a signal from the amplifier 42 of the exciter circuit by way of the terminals 112. The input from the terminals 112 is directed to a first input of the amplifier 106 through a resistor 114, and to a second input from the midpoint between a capacitor 116 and a potentiometer 118. Variation of the potentiometer 118 varies the reactance of the branch consisting of the capacitor 116 and the potentiometer 118. By varying the reactance by way of adjustment of the potentiometer 118, the output of the amplifier 106 can be made to vary in phase with respect to the input at the terminals 112. The inputs of the amplifier 110 are connected to the output of the amplifier 106 by circuitry similar to that associated with the inputs of amplifier 106, i.e., resistor 120, capacitor 122 and potentiometer 124. By adjustment of the potentiometer 124, the output of the amplifier 110, receiving the already partially phase shifted output of the amplifier 106, can be varied to further phase shift the signal.

The amplifiers 106 and 110 and their associated input circuitry are thus connected serially in order to perform additive phase shifts on the signal input to the terminals 112 in accordance with the adjustments of the potentiometers 118 and 124. The amplitude of the output of the amplifier 110 is independent of frequency, over a range, and the phase shifter of FIG. 4 is particularly flexible for this reason.

Attenuation of the desired reference signal in the embodiment of FIG. 4 is accomplished by adjustment of a potentiometer 126.

The terminals across the entire detector coil 22 are connected to an operational amplifier 130 which amplifies the signal across the detector coil 22 to a value comparable to that of the amplified and phase shifted reference signal derived from the signal input at the terminals 112, and appearing at the output of the potentiometer 126.

The bucking circuit of the balance circuit embodiment of FIG. 4 comprises a difference sensing amplifier 132, having an output which is a function of the difference between the signals on its input. One of the inputs of the difference sensing amplifier 132 is connected to receive the amplified signal from the detector coil 22, while the other input of the amplifier 132 is connected to receive the phase and amplitude adjusted output of the reference deriving circuit 60. When the reference deriving circuit 60 is adjusted by way of the potentiometers 118, 124 and 126 to provide a reference signal equal in amplitude and phase to the amplified error signal from the detector coil 22 produced when the coil is proximate to an unflawed workpiece, the error voltage is nulled out. This nulling effect is observed by noting when the output of the difference sensing amplifier 132 becomes zero. When this condition prevails, the error signal has been compensated for, and the amplifier 132 will produce an output only when a workpiece flaw is proximate the detection coil 22.

In either of the preferred embodiments of FIGS. 3 and 4, the output of the amplifier 100 (in the case of FIG. 3) and the output of the amplifier 132 (see FIG. 4) have a non-zero value only when a workpiece flaw is proximate the detection coil 22. This non-zero value will have a frequency equal to that of the carrier frequency, and will vary in amplitude and in phase from that of the exciter circuit signal in accordance with the type and extent of the flaw which is proximate the detection coil 22.

The output of the balancing circuit 52 is directed to the amplification and filtration stage 54, to amplify the signal from the detection coil 22 for further processing by the detection circuit, and to filter out noise.

The amplification and filtration stage 54 includes an amplifier 142, a band pass filter 144, an amplifier 146, and a meter 150. The amplifiers 142 and 146 preferably comprise integrated circuits corresponding to the designation 1741 for amplifying the carrier frequency emitted by the balance circuit 52. The band pass filter 144 has a pass band preferably centered about the carrier frequency, and serves to remove noise signals which may have infiltrated the output of the balancing cirucit 52. The meter 150 is preferably an AC voltmeter having an effective range of 0 to 15 volts, of the rectifier type. The meter 150 is used for sensing the magnitude of the signal output from the amplifier 146, in order to facilitate adjustment of that output to a value compatible for operation of the remainder of the circuitry of the system 10.

The exciter circuit 12 preferably has connected to it a demodulator reference generator 160 for producing a signal at the carrier frequency which is phase and amplitude controlled. The demodulator reference generator 160 includes a phase shifter 162 and a variable gain amplifier 164 connected to the output ot the phase shifter 162. The phase shifter 162 is preferably of a type similar to either of the phase shifters described in connection with the balance circuits 52 of the preferred embodiments shown in FIGS. 3 and 4, above. The amplifier 164 may be preferably any type of variable gain amplifier suitable for amplifying an AC signal having a frequency similar to that of the carrier. The phase shifter 162 has its input connected to the exciter circuit at the right-hand terminal of the capacitor 44, and generates a phase and amplitude adjustable signal at the output of the amplifier 164 having a frequency equal to that of the exciter circuit current.

The detection circuit 20 further includes the demodulation shaping circuitry 56. The demodulation shaping circuitry 56 receives the balanced, amplified and filtered signal generated by the detection coil 22 and output from the amplification and filtration circuitry 54, and generates a flaw indicating signal which is a function of the phase and amplitude difference between the signal generated by the detection coil 22 and the demodulator reference signal.

The demodulator shaping circuitry includes a demodulator 170, meter 172, a differential clipping circuit 174, an amplifier 176 and a level detector 180.

The demodulator 170 has two inputs, and produces an output signal which is a function of the differences in amplitude and phase between the two input signals. One input of the demodulator 170 receives the output of the amplifier 164 from the demodulator reference generator 160. The other input of the demodulator 170 receives the output of the amplification and filtration stage 54, a signal whose phase and amplitude is a function of those of the signal across the detection coil 22.

The output of the demodulator 170 is a maximum DC positive value when the two input signals are in phase, is a maximum negative value when the input signals are 180° out of phase, and is a zero output when the input signals are 90° or 270° out of phase, these values varying gradually between the stated extremes. The maximum positive and maximum negative values are a function of the amplitude difference between the input signals to the demodulator 170. Preferably, the demodulator 170 is a Taber No. 260–1 solid state demodulator.

The meter 172 receives the DC output of the demodulator 170, and measures it such that the performance of the demodulator can be analyzed in order that the output signal of the demodulator be adjusted to the compatible with the other circuitry of the system 10. The meter 172 is preferably a DC microammeter having a zero center and a range from 50 to minus 50 microamps.

The differentiating and clipping circuit 174 receives the output from the demodulator 170, and directs an output to the amplifier 176. The differentiating and clipping circuit 174 preferably comprises an RC network of a conventional design which eliminates the effect of low frequency fluctuations in the output of the demodulator 170 not representative of significant flaws in the workpiece W detected by the detection coil 22.

The amplifier 176 receives the output of the differential clipping circuit 174, and produces an output which is substantially devoid of low frequency variations. Preferably, the amplifier 176 is an integrated circuit operational amplifier, type 1741.

The output of the amplifier 176 is directed to the level detector 180. The level detector 180 emits an output only in response to inputs having a predetermined minimum value. The level detector 180 can be adjusted to respond only to signals from the demodulation and shaping circuitry 56 which correspond to significant flaws in the workpiece W, and will not respond to small signals indicating only insignificant flaws. The output of the level detector 180 comprising flaw indicating signals, is directed to the alarm trigger 24 in order to produce a signal indicating need for corrective action with respect to a workpiece in which a flaw has been detected. Preferably, the level detector is an operational amplifier operating in an open loop configuration. A first of its inputs receives the output of the amplifier 176, while a second input receives a signal of a predetermined voltage from a source (not shown). When the first input exceeds the second, the level detector 180 produces a signal indicating that a flaw of a predetermined magnitude has been detected.

A method of adjusting the detection circuit 20 for operation is as follows: a sample of the material being tested, containing a typical flaw, is placed proximate the detection coil 22. The reading on the meter 150 is observed, and the position of the flaw altered, until a maximum reading on meter 150 is obtained. The amplitude and phase adjustments of the demodulator reference circuit 160 are adjusted, and the meter 172 is observed until a maximum reading is obtained on the signal output from the demodulator 170. This condition then assures that a maximum demodulator output is obtainable in response to the passage of a typical workpiece flaw past the detection coil 22 preparing the detection circuit 20 for operation.

The alarm trigger circuit 24 receives the output of the detection circuit 20 and, in response to flaw indicating signals produced by the detection circuit 20, generates an alarm signal indicating the need for corrective action with respect to the workpiece in which a flaw has been detected. The alarm trigger circuit includes a monostable multivibrator 182, a solenoid 184, and an alarm device 186.

The monostable multivibrator 182 receives the output from the level detector 180, and in response produces an output. Preferably, the monostable multivibrator comprises a Motorola model MC 667.

The solenoid 184 preferably comprises a conventionally wound solenoid coil having a movable element associated therewith which moves in response to the flow of current through the coil.

The alarm device 186 responds to actuation of the solenoid 184 to generate an alarm signal. The alarm device 186 is preferably a device for producing an audio signal, such as a bell or buzzer, and is suitably associated with a marker apparatus (not shown) of known design for spraying a marking substance such as paint on the workpiece in the general area of the workpiece flaw observed.

The alarm trigger 24 also receives an input over the lead 50 from the meter relay 46 for actuating the alarm trigger circuit 24 to produce a signal indicating the presence of an open weld. The output of the meter relay 46 appearing on the lead 50 is generated in response to an open weld in the workpiece passing the exciter coil 14, in the manner discussed above. The output on the lead 50 persists for as long as an open weld having elongated configuration is passing by the exciter coil 14, so that the entire length of the open weld can be identified by the alarm device.

The phase monitor 36 responds to the coincidence of phase between the signal generated by the demodulator reference generator 160 and the output of the amplification and filtration stage 140 of the detection circuit 20 to identify, in a fashion supplemental to the action of the detection circuit 20, the presence of a specific type of workpiece flaw passing by the detection coil 22.

The phase monitoring circuit includes two zero detectors 190 and 192, two monostable multivibrators 194 and 196, an AND gate 200, and a second alarm trigger circuit 202.

The zero detectors 190 and 192 convert sinusoidal inputs thereto into square waves having a frequency equal to that of the sinusoidal inputs. The monostable multivibrators 194 and 196 are connected to the outputs of the zero detectors 190 and 192, respectively, and each produces a pulse output when the square wave input thereto undergoes a positive change.

The zero detectors 190 and 192, and the monostable multivibrators 194 and 196 combine to produce two pulse train outputs, the pulses of each output each occurring when the respective input to the associated zero detector passes through a zero value in a positive direction.

The AND gate 200 produces an output during coincidence of pulses at its two inputs. The AND gate 200 therefore produces an output only when the pulse trains from the respective monostable multivibrators 194 and 196 are coincident, i.e., when the inputs to the associated zero detectors 190 and 192 are phase.

The second alarm trigger circuit 202 receives the output from the AND gate 200 and is thereby actuated to produce an alarm signal. Such a signal indicates that the demodulator reference signal corresponds in phase to the signal output from the amplification and filtration stage 54 produced in response to a typical workpiece flaw. The second alarm trigger circuit is suitably similar to the alarm trigger circuit 24, and preferably may contain an alarm device for emitting a visual signal in response to the identification of a workpiece flaw. Such a second alarm trigger circuit 202 suitably comprises a monostable multivibrator 204, a solenoid 206, and an alarm device 208.

The system 10 also includes the end signal suppressor circuit 26 connected to the end sensing coil 30. The end sensing coil generates an end signal having at least a predetermined value in response to the passage of a workpiece end adjacent the end sensing coil. The end signal suppressor circuit responds to the generation of the end signal for temporarily disabling the detection circuit 20 from generating flaw indicating signals in response to the passage of the workpiece end adjacent the detection coil 22.

The end signal suppressor circuit includes an inhibitor circuit 219 connected to the end sensing coil and to the detector circuit 20 for disabling the detection circuit from producing the flaw indicating signals for a predetermined period of time following initiation of an end signal.

The inhibitor circuit includes an interrupter circuit 220 responsive to an input thereto to temporarily disable the detection circuit 20 from generating flaw indication signals during the time when a workpiece end passes the detection coil 22. The input to the interrupter circuit 220 is supplied by an amplitude sensing circuit 222 which responds to signals having at least a predetermined magnitude to actuate the interrupter circuit. The end signal circuit 26 also includes an amplifier state 224 having its output connected to the amplitude sensing circuit and its input connected to receive the end signals generated by the end sensing coil 30.

The interrupter circuit 220 comprises a switch 226, which, when actuated, shorts out the output of the amplifier 176, preventing the level detector 180 from responding to flaws in the workpiece W to generate flaw indication signals. The interrupter circuit also includes a delay dircuit 230 for deactuating the switch 226 a predetermined time after its actuation.

The input to the delay circuit 230 is supplied by the amplitude sensing circuit 222 to actuate the delay circuit 230 in response to the occurrence of end signals having at least a predetermined magnitude.

The amplitude sensing circuit 222 is actuated by the output of the amplifier stage 224, which in turn is actuated by an end signal input to the amplifier stage 224 from the end sensing coil 30.

The end sensing coil 30 may be of the differential type, by which end signals are produced in response to variations in either the DC saturation field produced by the saturator circuit 32 and the saturator coil 34 or in the alternating exciting field produced by the exciter circuit 12 and the exciter coil 14. Such end signals may be either DC pulses or alternating current signals. The interrupter circuit, however, operates in response to DC input signals. Therefore, if the alternating current signals are used, it is necessary to interpose a rectifier 236 between the end sensing coil and the interrupter circuit. The rectifier circuit 236 preferably comprises the diode 272, the capacitor 274 and the resistor 276.

A differential end sensing coil has the advantage of being insensitive to ambient fields which are relatively uniform. A differential end sensing coil can be placed very near the detection coil without potentially confusing influence from any signals but nonuniformities caused by workpiece ends, and to a lesser extent by workpiece flaws. This permissible proximity allows for the disabling of the detection circuit in response to end signals at substantially the same time the end is sensed passing the end sensor coil, without undue extension of the disabling period. This eliminates the need for timing circuitry for delaying the start of the disabling period until the sensed end has progressed to the detection coil.

The switch 226 is preferably a transistor having its emitter-collector circuit connected between ground and the output of the amplifier 176. When a positive pulse is applied to the base of the transistor 226, the transistor becomes conductive, shorting out the output of amplifier 176, preventing the generation of flaw indicating signals by the detector circuit 20.

The delay circuit 230 includes a timing branch having a variable resistor 240 and a capacitor 242, a charge storage branch including the capacitor 244 and the resistor 246, and a pulse generation circuit including the resistors 250, and 252, and the unijunction transistor 254.

The lower terminal of the unijunction transistor 254 is connected to the upper terminal of the resistor 246 by way of a diode 256.

The input to the delay circuit 230 is furnished by a voltage control circuit including a source of DC voltage (not shown) connected to an SCR 256 in series to ground through a resistor 260.

The operation of the interrupter circuit is as follows: The amplitude sensing circuit 222 directs signals from the end sensing coil 30 to the gate of the SCR 256. When the signals passed to the gate of the SCR 256 are of sufficient magnitude, the SCR becomes conductive, and the lower terminal of the SCR rises in potential. This potential rise is applied to transistor 226 causing it to conduct. The potential is also applied across the timing branch including the variable resistor 240 and the capacitor 242, and the voltage at the upper terminal of the capacitor 242 rises at a rate which is a function of the values of the resistor 240 and the capacitor 242. Simultaneously, the lower terminal voltage of the SCR 256 is applied to the storage branch, and a quantity of charge becomes stored upon the capacitor plates of the capacitor 244. When the voltage at the upper terminal of the capacitor 242 has risen sufficiently, the unijunction transistor 254 becomes conductive.

When the unijunction transistor 254 fires an instantaneous positive pulse appears across the resistor 252 and through the diode 260 to the resistor 246. This pulse forces the lower terminal of the SCR 256 to a potential greater than that of the potential furnished by the DC source, and the SCR 256 is thus rendered nonconductive. When this happens, the circuit returns to a steady state condition. The timing and storage branches are discharged, and the transistor 226 receives a lower potential on its base which renders the transistor 226 nonconductive. When the transistor 226 becomes nonconductive, the amplifier 176 is no longer shorted out, and the detector circuit 20 will resume its capability to generate flaw indicating signals in response to nonuniformities in the electromagnetic field sensed at the detection coil 22.

The amplifier stage 224 includes an operational amplifier 262 having a variable gain provided for by the potentiometer 264. The operational amplifier 262 receives the signal from the end sensing coil 30, amplifies it, and directs its output to the amplitude sensing circuit 222. The magnitude of the signal impressed on the potentiometer 222 necessary to fire the SCR 256 is determined by the setting of the wiper arm on the potentiometer 222 and by the values of the resistors 266 and 270.

When ferromagnetic materials are tested, the end signals are produced in response to changes in the DC saturating field as well as to changes in the exciter field. In this event, the end sensing coil 30 will respond to both variations in the DC saturating field and also to the alternating current variations in the exciter field. Since the DC saturating variations are the only ones desirable to consider in this latter type of end sensing the end signal suppressor circuit of this invention is suitably provided with an AC shorting capacitor 239 which is connectable across the inputs of the amplifier 262 of the amplifier stage 224.

The provision of the rectifier 236, discussed above, and the shorting capacitor 239 provide adaptability for the end signal suppressor circuit of the present invention whereby it may be simply and quickly changed to be operable with either AC or DC field changes, simply by the insertion of the capacitor 239 when the DC field change is used, and by the interposition of the rectifier 236 when the AC field change is used.

Accordingly, the end signal suppressing circuit of this invention provides for temporary disablement of the detection circuit in response to the passage of a workpiece end past the detection coil for only so long a period as is necessary for the flaw to clear the detection coil. This time can be adjustable by regulating the value of the variable resistor 240.

There is no need to disable the detection circuit for long periods of time, such as during intervals between the trailing edge of one workpiece and the leading edge of the next. Moreover, once the end signal suppressor circuit has been triggered by a workpiece end, there is no need for any separate triggering in order to re-enable the detection circuit. The present preferred end signal suppressor circuit provides for the automatic re-enablement of the detection circuit 20.

While the invention has been illustrated and described in reference to a signal embodiment of one preferred construction, the invention is not to be considered limited to the precise construction disclosed. Various adaptations, modifications and uses of the invention may occur to those skilled in the art and the intention is to cover all such adaptations, modifications and uses which come within the spirit or scope of the claims.

What is claimed is:

1. A system for detecting flaws in a relatively moving workpiece, comprising:
   a. means for moving the workpiece relatively along a path;
   b. an exciter circuit having a complex input impedance and being connectable to an electric power source for generating an alternating exciting field in the workpiece region and having a member inductively couplable to the workpiece to vary the value of the complex input impedance in response to the presence of a flaw in the inductively coupled moving workpiece;
   c. an open weld detector for detecting open welds in the coupled workpiece by sensing said variations in the complex impedance, comprising:
      i. circuitry for rendering the complex input impedance of the exciter circuit resonant when said member is inductively coupled with an unflawed workpiece, and
      ii. a circuit for sensing detuning of the complex input impedance from its resonant value responsive to the presence of a flaw in the inductively coupled workpiece;
   d. a detection circuit for sensing variations in the exciting field in response to the presence of flaws in the workpiece, said detection circuit comprising:
      i. a differential coil for producing a net voltage thereacross in the presence of a workpiece flaw, and
      ii. a balance circuit for nulling an error voltage produced by the differential coil in the presence of an unflawed workpiece, said balance circuit comprising:
         1. a circuit for deriving a phase and amplitude controlled reference signal having a frequency equal to that of the alternating field, and
         2. a bucking circuit for combining the reference signal and the error signal produced across the entire differential coil to produce an output having a zero value for indicating when the error signal is nulled by the reference signal;
   e. said detection circuit producing flaw indicating signals having a predetermined phase which is a function of the type and extent of workpiece flaws detected by the detection circuit;
   f. an end signal suppressor for temporarily disabling the detection circuit from generating flaw indicating signals in response to the passage of an end of the workpiece through the exciting field, the end signal suppressor comprising:
      i. an end sensing coil for generating an end signal of at least a predetermined value in response to the passage of a workpiece end through the field, and
      ii. an inhibiting circuit connected to the end sensing coil and the detector circuit for disabling the detector cirucit from producing the flaw indicating signals for a predetermined time period following the occurrence of the end signal;
   g. circuitry for generating a reference alternating signal having a frequency equal to that of the exciting field and a controlled phase equal to the phase displacement of the flaw indicating signal in response to a workpiece flaw, and
   h. a phase monitoring circuit comprising:
      i. first and second zero detectors connected respectively to the reference generating circuit and the detection circuit,
      ii. first and second monostable multivibrators connected respectively to the first and second zero detectors for each producing an output when the corresponding one of the reference signal and the flaw indication signal passes through a zero value in a predetermined direction, and
      iii. an AND gate having two inputs each connected to the output of a different one of the monostable multivibrators for providing an output when the values of the reference and flaw indicating signals pass through zero values simultaneously and are in phase with one another.

* * * * *